(12) United States Patent
Juliato et al.

(10) Patent No.: US 10,868,817 B2
(45) Date of Patent: Dec. 15, 2020

(54) SYSTEMS AND METHODS FOR NEUTRALIZING MASQUERADING ATTACKS IN VEHICLE CONTROL SYSTEMS

(71) Applicant: Intel Corporation, Santa Clara, CA (US)

(72) Inventors: Marcio Juliato, Portland, OR (US); Shabbir Ahmed, Beaverton, OR (US); Santosh Ghosh, Hillsboro, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 16/026,413

(22) Filed: Jul. 3, 2018

(65) Prior Publication Data

US 2019/0052654 A1 Feb. 14, 2019

(51) Int. Cl.
  *H04L 29/06* (2006.01)
  *H04L 29/08* (2006.01)
  *H04L 12/40* (2006.01)
  *G06F 21/64* (2013.01)
  *H04W 4/40* (2018.01)
  *H04W 4/00* (2018.01)

(52) U.S. Cl.
  CPC .......... *H04L 63/1416* (2013.01); *G06F 21/64* (2013.01); *H04L 12/40* (2013.01); *H04L 63/0236* (2013.01); *H04L 63/145* (2013.01); *H04L 63/1441* (2013.01); *H04L 67/12* (2013.01); *H04W 4/00* (2013.01); *H04W 4/40* (2018.02); *H04L 2012/40215* (2013.01); *H04L 2012/40273* (2013.01)

(58) Field of Classification Search
  CPC ....... G06F 21/64; H04L 63/1416; H04W 4/40
  USPC ...................................... 726/22–25
  See application file for complete search history.

(56) References Cited

U.S. PATENT DOCUMENTS

| | | | |
|---|---|---|---|
| 2017/0195878 A1* | 7/2017 | Takemori | B60R 16/023 |
| 2019/0016345 A1* | 1/2019 | Kitagawa | B60W 50/14 |

OTHER PUBLICATIONS

Wikipedia; "CAN bus", https://en.wikipedia.org/wiki/CAN_bus; May 1, 2018; 15 pages.

(Continued)

*Primary Examiner* — Anthony D Brown
(74) *Attorney, Agent, or Firm* — Trop, Pruner & Hu, P.C.

(57) ABSTRACT

A data processing system that provides for active prevention of masquerading attacks comprises a microcontroller, a transceiver, and an active attack prevention module (AAPM) in communication with the microcontroller and the transceiver. The microcontroller enables the data processing system to operate as a node in a vehicle control system (VCS). The transceiver enables the node to communicate with a local area network (LAN) of the VCS. The AAPM enables the node to monitor the LAN for messages. In response to detecting a message on the LAN, the AAPM automatically determines whether the message falsely identifies the node as a source, based on a value in an identifier field in the message. In response to determining that the message falsely identifies the node as the source, the AAPM automatically takes at least one remedial action to neutralize the message. Other embodiments are described and claimed.

20 Claims, 5 Drawing Sheets

(56) References Cited

OTHER PUBLICATIONS

Texas Instruments Incorporated; "Introduction to the Controller Area Network (CAN)"; 2016; 17 pages.
Wikipedia; "Mobileye", https://en.wikipedia.org/wiki/Mobileye; May 1, 2018; 6 pages.
Wikipedia; "Advanced driver-assistance systems"; https://en.wikipedia.org/wiki/Advanced_driver-assistance_systems; May 15, 2018; 5 pages.
Bosch; "CAN Specification, Version 2.0"; Sep. 1991; 72 pages; Robert Bosch GmbH, Posffach 50; D-7000 Stuttgart 1.
Mircochip Technology Inc.; "MCP2551: High-Speed CAN Transceiver"; 2010; 24 pages.
Mircochip Technology Inc.; "MCP2551: High-Speed CAN Transceiver"; 2016; 26 pages.
Mircochip Technology Inc.; "MCP2515: Stand-Alone CAN Controller with SPI Interface"; 2003-2012; 92 pages.
Mircochip Technology Inc.; "MCP2515: Stand-Alone CAN Controller with SPI Interface"; 2007; 84 pages.
Intel Corporation; "Product Brief: Intel® GO™ Automated Driving Solution"; 2017; 6 pages.

* cited by examiner

SYSTEMS AND METHODS FOR NEUTRALIZING MASQUERADING ATTACKS IN VEHICLE CONTROL SYSTEMS

TECHNICAL FIELD

The present disclosure pertains in general to computer security and in particular to systems and methods for neutralizing masquerading attacks in vehicle control systems.

BACKGROUND

Many modern vehicles include numerous different electronic control units (ECUs), including some ECUs that are very important for safety. For instance, the ECUs in an autonomous or semi-autonomous vehicle may include an engine control module (ECM), a transmission control module (TCM), a steering control module (SCM), a brake control module (BCM), a global positioning system (GPS) control module (GPSM), a vision control module (VCM), a heading control module (HCM), an in-vehicle infotainment unit (IVIU), etc. The ECUs in a vehicle may be referred to collectively as a vehicle control system.

An ECU may include a processor and software that executes on the processor to cause that ECU to perform the desired operations. Such a processor may be referred to as a microcontroller unit (MCU), and such software may be referred to as firmware. If an attacker can load malicious software ("malware") into an ECU, that malware may cause the ECU to perform malicious operations which can compromise vehicle safety and be very dangerous.

One attack vector is to compromise an ECU with malware that causes the ECU to masquerade as a different ECU. For instance, malware in an IVIU may cause the IVIU to masquerade as the VCM. For example, the malware may cause the IVIU to send messages that seem to have originated at the VCM, and those messages may include malicious data, such as incorrect information about whether the vehicle is within a desired lane, thereby causing the vehicle to veer off of the road.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
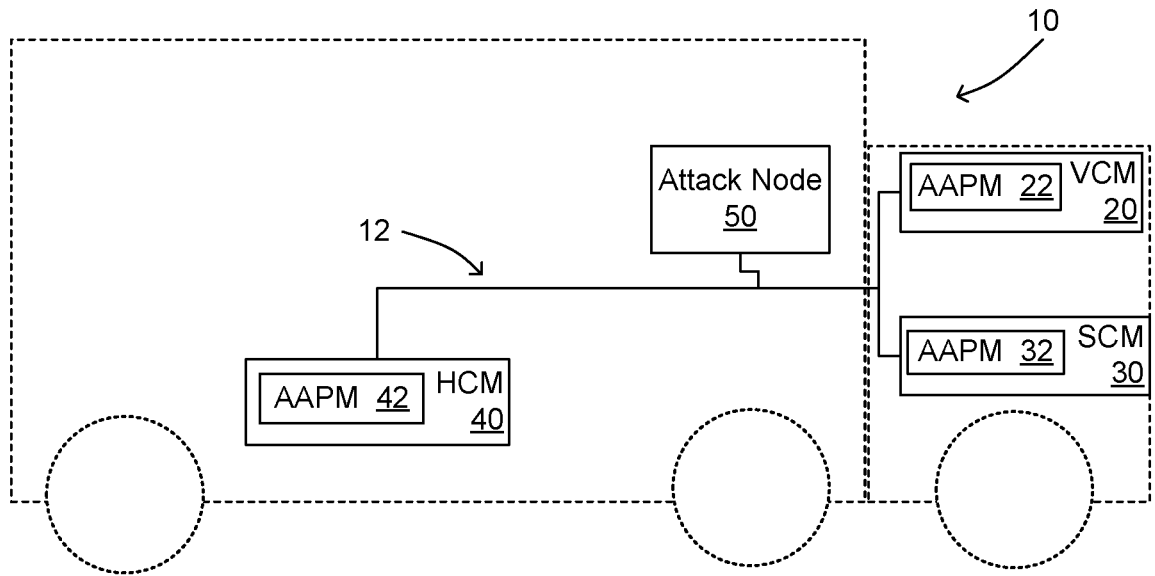
FIG. 1 is a block diagram of an example embodiment of a vehicle control system with technology for neutralizing masquerading attacks.

As indicated above, masquerading attacks in vehicle control systems can be very dangerous. Such attacks may affect critical ECUs such as the ones responsible for steering, braking, accelerating, and overall sensing. For instance, a compromised ECU may masquerade as an ECU that is fundamental for the lateral control of the vehicle, thereby injecting malicious position and heading information that causes the vehicle to veer off of the road.

The present disclosure presents systems, methods, and apparatus for neutralizing masquerading attacks in vehicle control systems. In particular, as described in greater detail below, the present disclosure describes a hardware-based approach to actively neutralize or block masquerading attacks at runtime. For purposes of this disclosure, an ECU in a VCS may be referred to as a node, and the local area network (LAN) for the VCS may be referred to as in in-vehicle network. Also, for purposes of this disclosure, a message that includes false information concerning the source of the message may be referred to as a masquerading message.

According to the present disclosure, at least one node in a VCS continually monitors the bus of the VCS to detect the onset of a masquerading message that is being injected by a malicious node. For instance, the malicious node may be attempting to masquerade as the monitoring node (i.e., the node that is monitoring the bus). Upon detecting the onset of a masquerading message, the monitoring node neutralizes the attack before the attacker succeeds (e.g., before any nodes accept the masquerading message as valid).

For example, the monitoring node may include a bus transceiver and control logic in communication with the transceiver. The control logic may read all network information from the bus, via the transceiver. The control logic may also differentiate between messages that are transmitted by the authentic node and messages that are received by the authentic node but not transmitted by the authentic node. Consequently, the control logic may detect and neutralize masquerading attacks. The control logic which enables the monitoring node to detect a new message, to extract the message identifier from that message, to determine whether the message identifier is false, and to neutralize a masquerading message may be referred to as an active attack prevention module (AAPM), an active attack prevention circuit (AAPC), or an active attack prevention device (AAPD).

For purposes of this disclosure, the characteristics of a message which are supposed to identify the source or "owner" of that message may be referred to as the message identifier (ID). A message ID may be implemented as part of a message header, as physical characteristics such as voltage and/or frequency, etc. If a node is receiving a message containing that node's message ID, but the node is not transmitting that message, the node may conclude that the message ID is false. In particular, the receiving node may conclude that the message is masquerading as having been sent by the receiving node. In other words, the receiving node may conclude that the message is spoofing the receiving node. Accordingly, if the physical layer identifies the receiving node as the source, but the receiving node is not really the source, the receiving node may treat the message as unauthentic. Consequently, as described in greater detail below, the node may neutralize the message. In other words, the node may alter the message in such a way that the message becomes innocuous for the system. Additionally, the node may take actions to remove the actual source of the message (i.e., the compromised node) from participation on the bus.

FIG. 1 is a block diagram of an example embodiment of a vehicle control system 10 with technology for neutralizing masquerading attacks. In the embodiment of FIG. 1, vehicle control system (VCS) 10 includes various ECUs which communicate with each other via a LAN. For purposes of illustration, the nodes in VCS 10 include a VCM 20, an SCM 30, an HCM 40, and an IVIU 50. However, as described in greater detail below, in the illustrated embodiment, IVIU 50 has been infected with malware. Accordingly, IVIU 50 is illustrated as attack node 50.

In the embodiment of FIG. 1, the LAN uses a controller area network (CAN) bus 12. Accordingly, the nodes in VCS 10 communicate with messages that include message IDs, and the message ID in each message is supposed to identify the source node for that message. In other words, each message ID should be associated with only one node. In addition, as described in greater detail below, a single node may use different message IDs for different types of messages. However, each node is not supposed to use any message ID that is associated with any other node.

As described in greater detail below, at least one node in VCS 10 includes an AAPM which enables the node to detect and disrupt attacks before those attacks have succeeded. In the embodiment of FIG. 1, VCM 20 includes an AAPM 22, SCM 30 includes an AAPM 32, and HCM 40 includes an AAPM 42. As described in greater detail below, the AAPMs provide for runtime active neutralization of masquerading attacks. AAPMs may also provide for prevention or reduction of future attack attempts. For instance, as described in greater detail below, one or more AAPMs may cause a malicious node to disconnect itself from the bus, thereby isolating the attacker.

As described in greater detail below with regard to FIG. 7, each message is structured in a frame according to a predefined format, such as the CAN bus extended frame format, with the message ID situated at or very near the beginning of the frame. As indicated above, the message ID is a fundamental piece of information that is supposed to identify the source of the message. In other words, the message ID is supposed to indicate which node the message "belongs to." The AAPM in a node is designed to inspect the message ID at the beginning of each frame and to use the message ID as a trigger to block or neutralize messages attempting to masquerade as coming from that node.

An AAPM may be implemented as a field programmable gate array (FPGA) or as any other suitable construct.

Figure 2:
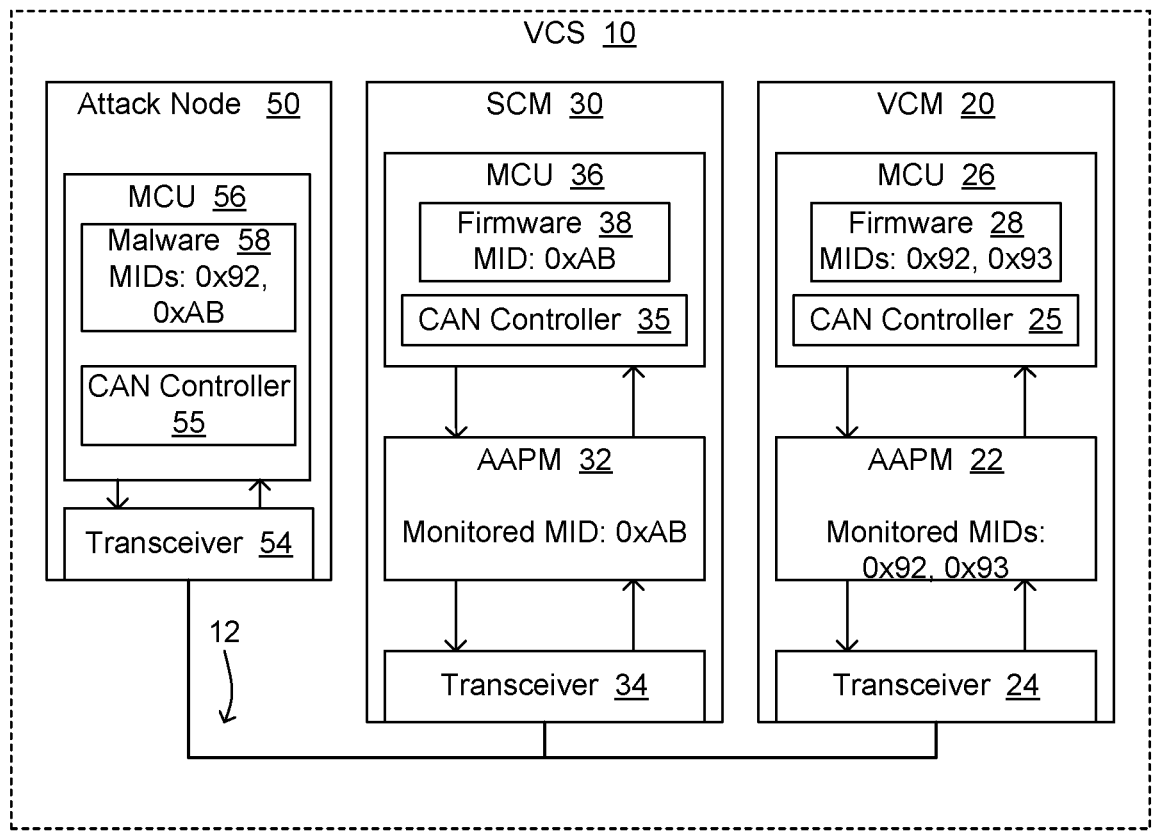
FIG. 2 is a block diagram of the vehicle control system of FIG. 1, with additional details for certain nodes.

FIG. 2 is a block diagram of VCS 10, with additional details for VCM 20, SCM 30, and attack node 50. For purposes of clarity and brevity, some features of VCS 10, such as HCM 40, are not depicted in FIGS. 2-4. Similarly, for purposes of clarity and brevity, SCM 30 is not depicted in FIGS. 3 and 4. However, HCM 40 and SCM 30 may operate substantially as described below with regard to VCM 20.

As illustrated in FIG. 2, VCM 20 includes an MCU 26, firmware 28, and a transceiver 24. VCM 20 also includes a CAN controller 25. In the embodiment of FIG. 2, CAN controller 25 is implemented as part of the same chip or package as MCU 26. In another embodiment, the CAN controller may be implemented as a distinct, stand-alone chip or package, external to the MCU chip or package.

In the embodiment of FIG. 2, MCU 26 is responsible for running firmware 28 and for sending data to CAN controller 25. CAN controller 25 is responsible for the entire CAN protocol, including the reception of outgoing data from MCU 26, the creation of frames, the sending of frames as digital data to transceiver 34, bus arbitration, error detection, etc. CAN transceiver 24 is responsible for converting the digital data received from CAN controller 25 to the analog levels of the CAN physical channel. Transceiver 24 also reads the bus and feeds that information back to CAN controller 25, to enable CAN controller 25 to perform operations such as arbitration and error checking. The MCUs, CAN controllers, and transceivers in the other nodes operate similarly.

In addition, VCM 20 includes AAPM 22 in communication with transceiver 24 and MCU 26. As described in greater detail below, AAPM 22 enables VCM 20 to detect and disrupt attacks before those attacks have succeeded. Similarly, SCM 30 includes an MCU 36, firmware 38, a CAN controller 35, a transceiver 34, and an AAPM 32 in communication with transceiver 34 and MCU 36. Attack node 50 also include an MCU 56, firmware, a CAN controller 55, and a transceiver 54. However, as indicated above, the firmware in attack node 50 has been infected or replaced with malware 58. In one embodiment, each node stores its firmware in nonvolatile storage in its MCU.

As indicated above, each uncorrupted node uses one or more message IDs (MIDs) to identify the source of the messages transmitted by that node. In other words, each uncorrupted node owns a set of MIDs. For purposes of illustration, the embodiment of FIG. 2, firmware 28 is shown as having been configured to use MIDs 0x92 and 0x93 for two different types of messages generated by VCM 20. Similarly, for purposes of illustration, firmware 38 is shown as having been configured to use MID 0xAB for messages generated by SCM 30.

In addition, AAPM 22 in VCM 20 is configured to monitor CAN bus 12 for messages that use MIDs 0x92 and 0x93, in order to determine whether such messages are coming from a node other than VCM 20. As described in greater detail below, in response to detecting a message that (a) has a MID of 0x92 or 0x93 and that (b) is coming from a node other than VCM 20, AAPM 22 automatically concludes that the message is an attack, and AAPM automatically neutralized the message. Likewise, AAPM 32 in SCM 30 is configured to monitor CAN bus 12 for messages that use MID 0xAB, and AAPM 32 automatically neutralizes masquerading messages that use the MID for SCM 30.

In the embodiment of FIG. 2, for purposes of illustration, MCU 56 in attack node 50 is depicted as having been configured by malware 58 to use MIDs 0x92 and 0xAB for masquerading messages generated by attack node 50. For instance, as described in greater detail below, attack node 50 may transmit a message with MID 0x92 and with a malicious data payload (such as a malicious steering command), in an attempt to fool one or more other nodes in VCS 10.

Figure 3:
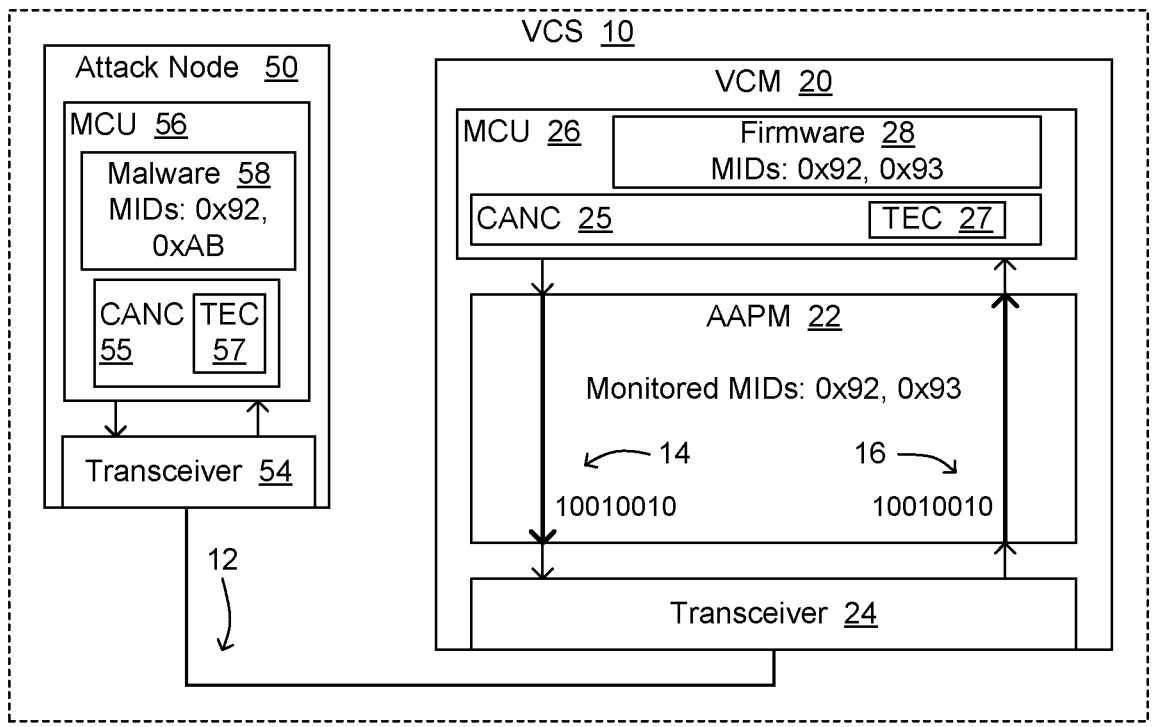
FIG. 3 is a block diagram of the vehicle control system of FIG. 2, with data reflecting a message that is not masquerading.

FIG. 3 is a block diagram of VCS 10, with data reflecting a message that is not masquerading. In particular, as indicated by transmission arrow 14 in FIG. 3, MCU 26 is transmitting a message with MID 0x92 (0b10010010) to CAN bus 12 via transceiver 24. Also, as indicated by reception arrow 16 in FIG. 3, MCU 26 is receiving that same message (with MID 0x92 or 0b10010010) from CAN bus 12 via transceiver 24. FIG. 3 also shows that AAPM 22 monitors the transmissions from MCU 26 to transceiver 24 and the receptions from transceiver 24.

In particular, when a node transmits a message using the transmit line, the transceiver first converts the message to the analog bus levels of the physical layer. The transceiver also reads the bus levels back. All other network nodes will see their receive line active during reception, and their transmit line will only become active to acknowledge the message.

As described in greater detail below, when AAPM 22 detects a message on CAN bus 12 that (a) has one of the MIDs associated with VCM 20 and that (b) is actually being generated by VCM 20, AAPM 22 determines that the message is not masquerading, and AAPM 22 allows the message to proceed without interference.

Figure 4:
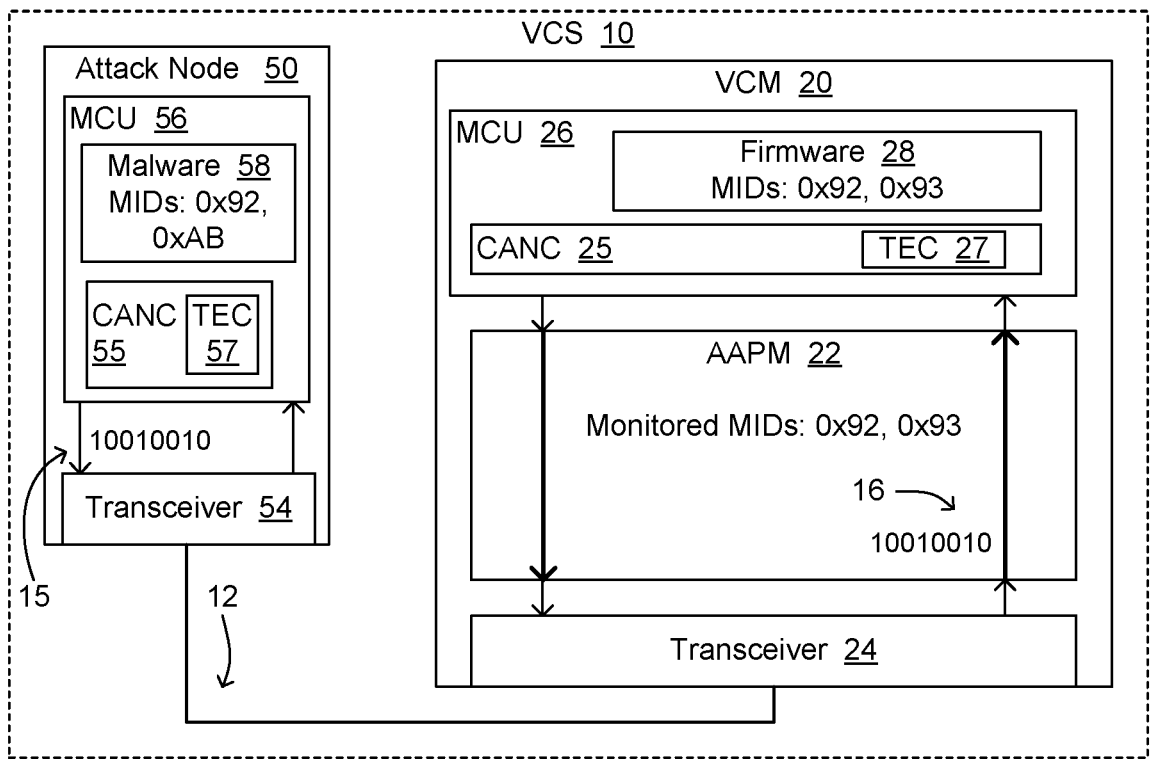
FIG. 4 is a block diagram of the vehicle control system of FIG. 2, with data reflecting a message that is masquerading.

FIG. 4 is a block diagram of CVS 10, with data reflecting a message that is masquerading. In particular, as indicated by transmission arrow 15 in FIG. 4, MCU 56 in attack node 50 is masquerading as VCM 20 by transmitting a message with MID 0x92 (0b10010010) to CAN bus 12 via transceiver 54. Also, as indicated by reception arrow 16 in FIG. 3, MCU 26 in VCM 20 is receiving that message from CAN bus 12 via transceiver 24. FIG. 4 also shows that AAPM 22 monitors the transmissions from MCU 26 to transceiver 24 and the receptions from transceiver 24. As described in greater detail below, when AAPM 22 detects a message on CAN bus 12 that (a) has one of the MIDs associated with VCM 20 but that (b) is not actually being generated by VCM 20, AAPM 22 determines that the message is masquerading, and AAPM 22 actively neutralizes that message.

From the perspective of an authentic node (e.g., VCM 20), its messages should only be received on the receive line when that node is transmitting via the transmit line. If the authentic node is not transmitting, as shown in FIG. 4, and a message purporting to come from the authentic node has been injected into the bus by an attacker (e.g., attack node 50), the AAPM of the authentic node will neutralize the message before it is consumed by the other nodes of the bus.

As described in greater detail below, one way of neutralizing a message is to manipulate the physical channel levels. For instance, AAPM 22 may write one or more mismatching bits to the transmit line, as described in greater detail below. That operation will cause the bus to assume a superposed level, thereby modifying the bits of the attacker's message. As a consequence, the receiving nodes will observe a lack of message integrity and will not consume the message.

Furthermore, since the authentic node precisely neutralizes masquerading messages, the authentic node may produce no false positives or negatives. Every time the authentic node detects a message that purports to come from the authentic node, but the authentic node is not actually transmitting the message, the node may reliably conclude that the message was injected by another node.

In one embodiment, CAN bus 12 achieves high levels of reliability with a single pair of differential signals, referred to as CAN high (CANH) and CAN low (CANL). Each CAN node may not have a particular identity, per se. However, each node has an associated set of message IDs, and those message IDs do not overlap with any other nodes. The message ID may be used not only to identify the type of message received (e.g., to acquire the signals carried by the payload of the message), but also to resolve bus arbitration.

In particular, arbitration may be resolved by the way that the bus operates. At the physical level, a logical 0 is referred to as a dominant signal, where CANH would output 3.5 voltz (V) and CANL 1.5V. A logical 1 is referred to as a recessive signal, whose nominal voltages are approximately 2.5V for both CANH and CANL. Dominant levels always overwrite recessive ones. Consequently, for competing messages, the message with the lowest digital representation in the message ID (i.e., the representation with the most leading 0s) will win the bus over all messages with higher message IDs. As described in greater detail below, this CAN feature may be leveraged to block the attacker's messages.

Each node is only supposed to use its own message IDs when generating messages. But at the receiving end, it may be difficult or impossible to determine which node actually sent a given message. Due to the absence of a built-in authentication mechanism, a compromised node may send a message with any message ID to the bus. Consequently, malicious messages may be sent by any compromised node. In the case of vehicles, compromised ECUs may masquerade as other critical systems, such as the ECUs responsible for braking, acceleration and steering. However, nodes with AAPMs according to the present disclosure may fully address such vulnerabilities.

Figure 5:
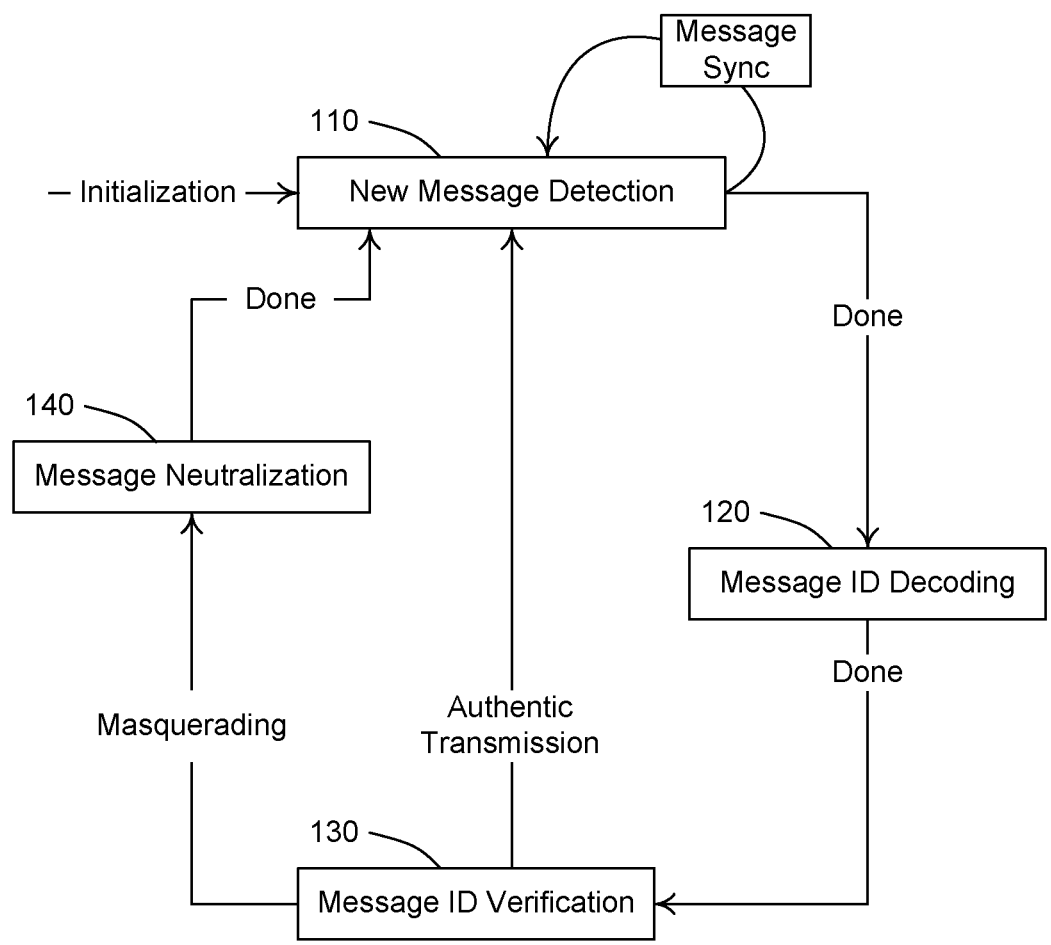
FIG. 5 is a state diagram for an example embodiment of a process for intercepting and neutralizing attack messages.

FIG. 5 is a state diagram for an example embodiment of a process for intercepting and neutralizing attack messages. That process may be performed by an AAPM such as AAPM 22, for instance. Additionally, the process can be divided in four main states: new message detection 110, message ID decoding 120, message ID verification 130, and message neutralization 140, as shown in FIG. 5. An AAPM may include different components which enable the AAPM to perform new message detection, message ID decoding, message ID verification, and message neutralization 140.

Figure 6:
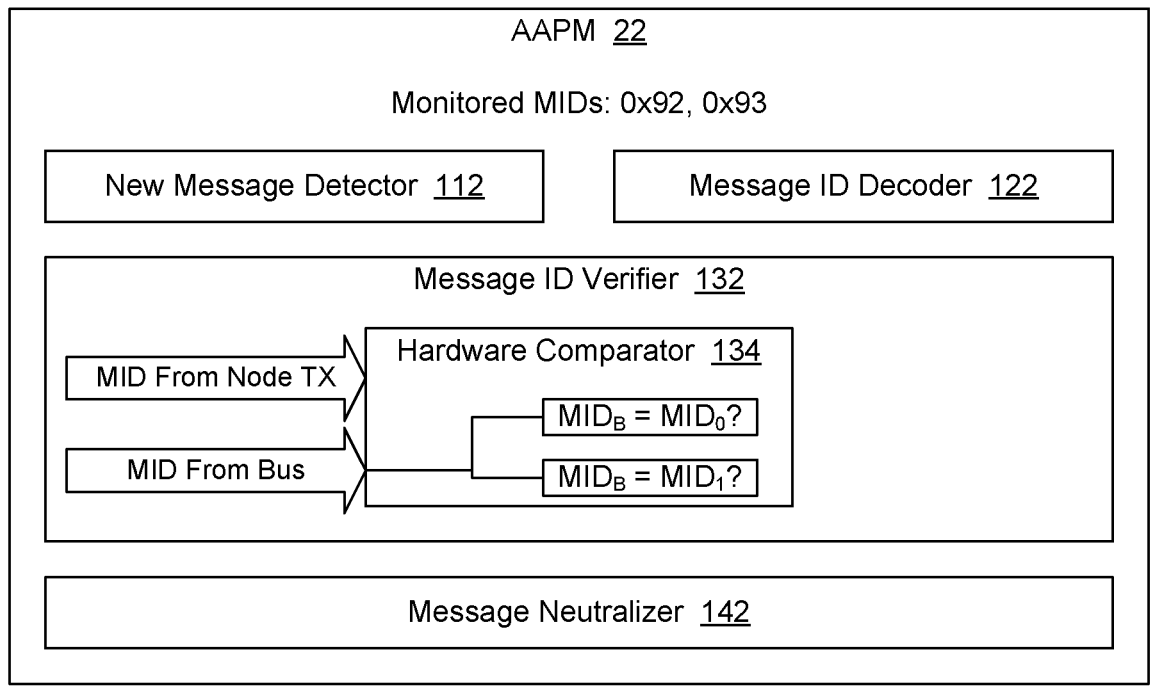
FIG. 6 is a block diagram illustrating an example attack prevention module in greater detail.

FIG. 6 is a block diagram illustrating an example AAPM in greater detail. In particular, FIG. 6 illustrates AAPM 22 as containing a new message detector 112, a message ID decoder 122, a message ID verifier 132, and a message neutralizer 142.

Figure 7:
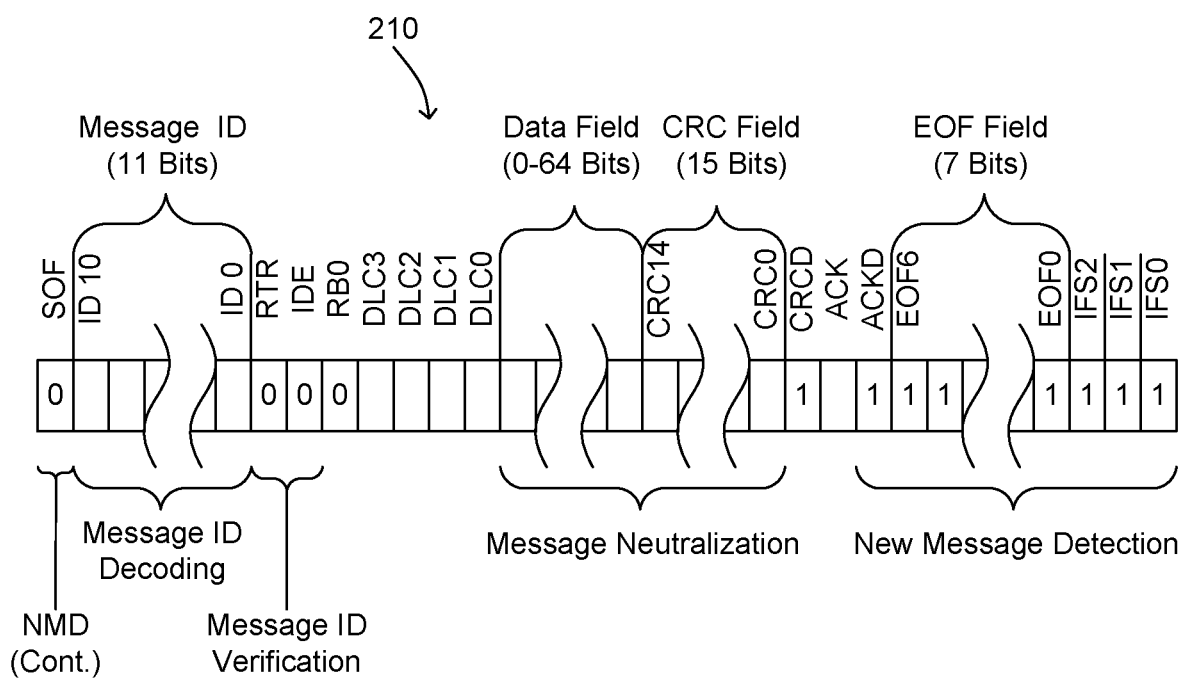
FIG. 7 is a block diagram illustrating an example message format and relating various attack prevention operations with various parts of a message from an ECU.

FIG. 7 is a block diagram illustrating an example message format 210 and relating various attack prevention operations with various parts of a message from an ECU.

Figure 8:
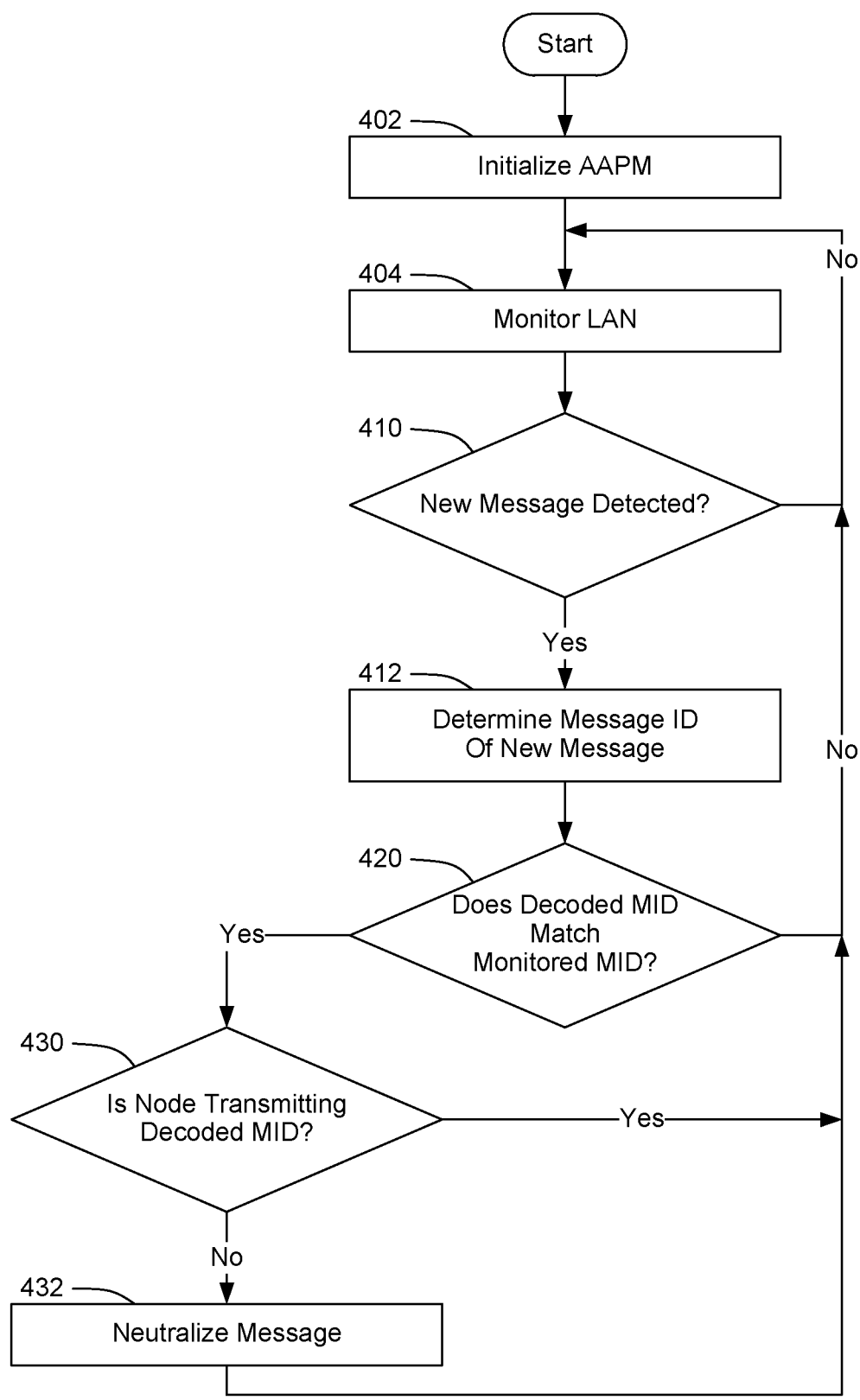
FIG. 8 presents a flowchart of an example embodiment of a process for detecting and neutralizing masquerading attacks.

FIG. 8 presents a flowchart of an example embodiment of a process for detecting and neutralizing masquerading attacks.

As shown at block 402 of FIG. 8 and before block 110 of FIG. 5, AAPM 22 may begin by initializing itself into a desired configuration. For instance, AAPM 22 may configure itself to monitor all of the MIDs assigned to VCM 20. As shown at block 110 of FIG. 5, AAPM 22 may then enter the new message detection state. For instance, AAPM 22 may activate new message detector 112. Then, in order to read a new message, new message detector 112 may start by synchronizing its sampling mechanism.

As illustrated in FIG. 7, each CAN message begins with a start-of-frame (SOF) bit, which is always dominant (0), and ends with a sequence of eleven 1s in the following fields: ACK delimiter (ACKD), end-of-frame (EOF) 0-6, and interframe space (IFS) 0-2. (IFS may contain a sequence of 3 or more recessive (1) bits.) Accordingly, synchronization happens by detecting the eleven bits of the previous message, and then waiting for the start-of-frame bit of the new message. Accordingly, as shown in FIG. 7, new message detector 112 performs new message detection (NMD) while processing the parts of message 210 labeled as "New Message Detection" and "NMD (Cont.)". The process of waiting for the start-of-frame bit is described in FIG. 5 as "Message Sync." Similarly, the operations for monitoring the bus and waiting for a new message are illustrated in FIG. 8 at blocks 404 and 410.

In response to detecting a new message, AAPM 22 may activate message ID decoder 122, as shown at block 120 of FIG. 5. As shown at block 412 of FIG. 8, message ID decoder 122 may then perform real-time decoding of the message ID in the new message. The message ID decoding starts immediately after the start-of-frame bit, as shown in FIG. 7 by the area labeled as "Message ID Decoding". All eleven bits of the message ID field are extracted by the hardware of message ID decoder 122. Accordingly, the decoded message ID may also be referred to as extracted.

The decoding operation is completed in a very timely manner so that this operation and other operations for detecting and neutralizing a malicious message can be performed while the malicious message is still on the bus at VCM 20. For example, message ID decoder 122 may include a built-in sampling mechanism which outputs the message ID as soon as message ID decoder 122 finishes receiving the message ID.

Once message ID decoder 122 has extracted the message ID, AAPM 22 may use message ID verifier 132 to determine whether that message ID is owned by VCM 20, as shown at blocks 130 of FIG. 5 and 420 of FIG. 8. In other words, message ID verifier 132 may determine whether the extracted message ID matches any of the message IDs that AAPM 22 is configured to monitor. In addition or alternatively, as indicated below, message ID verifier 132 may determine whether VCM 20 is currently transmitting a message with that message ID.

Message ID verification should be completed as quickly as possible, ideally before of the start of the data field of the CAN message, to maximize the number of bits that can be modified in the message neutralization phase. For instance, in one embodiment, message ID verifier 132 performs verification within the time period referenced in FIG. 7 with the label "Message ID Verification." Accordingly, as soon as the message ID has been decoded, AAPM 22 sends it to message ID verifier 132.

Additionally, in the embodiment of FIG. 6, message ID verifier 132 includes a control logic construct referred to as a hardware comparator 134, and hardware comparator 134 performs a parallel/simultaneous comparison of all message IDs being monitored against the decoded message ID, as illustrated in FIG. 6. In particular, in FIG. 6, the decoded message ID from the message being received on receive line 16 is referred to as the message ID from CAN bus 12 ("MID From Bus" or "$MID_B$"). Also, the message IDs assigned to VCM 20 are referred to as "$MID_0$" and "$MID_1$." For instance, referring again to FIG. 3, in one embodiment or scenario, $MID_0$ may be 0x92, $MID_1$ may be 0x93, and $MID_T$ may be 0x92 (0b10010010). Also, the message ID from the message being transmitted on transmit line 14 by VCM 20 (if any) is referred to as "MID From Node TX" or "$MID_T$".

If $MID_B$ does not match any of the monitored MIDs, hardware comparator 134 generates a negative match signal, since VCM 20 does not own $MID_B$, and therefore the message is not masquerading as having come from VCM 20. Instead, $MID_B$ may actually belong to the node that is transmitting the message. Accordingly, no remedial action is necessary. As shown in FIG. 8, the process may then pass from block 420 to block 404, and AAPM 22 may continue monitoring the LAN for the next new message.

However, if $MID_B$ matches a monitored MID, either of the following situations may exist: the message is being sent by VCM 20 with an authentic message ID, or the message is being sent by another node with a false message ID. Accordingly, as shown at block 430 of FIG. 8, hardware comparator 134 determines whether VCM 20 is currently transmitting the message with that message ID (e.g., based on $MID_T$). If $MID_B$ matches $MID_T$, no remedial action is necessary, since hardware comparator 134 has detected a valid read-back situation. Accordingly, as shown in FIG. 8, the process may then pass from block 430 to block 404, and AAPM 22 may continue monitoring the LAN for the next new message. Similarly, as shown in FIG. 5, when hardware comparator 134 determines that the message is not masquerading as having been generated by VCM 20, the state of AAPM 22 may switch from Message ID Verification 130 to New Message Detection 110.

However, if $MID_B$ does not matches $MID_T$, that message should not be in the bus since it was not transmitted with an authentic message ID. Accordingly, as shown at block 432 of FIG. 8, AAPM 22 may invoke message neutralizer 142 to neutralize the message. Similarly, as shown in FIG. 5, when hardware comparator 134 determines that the message is masquerading as a message from VCM 20, the state of AAPM 22 may switch from Message ID Verification 130 to Message Neutralization 140.

Message neutralizer 142 may neutralize the message during the time period illustrated in FIG. 7 with the label "Message Neutralization." In one embodiment, message neutralizer 142 neutralizes the message by leveraging the dominant/recessive signal behavior of CAN bus 12. In particular, message neutralizer 142 writes into the transceiver transmit line 16 in such a way that at least one dominant level from transceiver 24 overwrite at least one recessive bit in the message from the attacker. Message neutralizer 142 may use any suitable location for the overwrite. Due to the speed and efficiency of message ID verifier 132, there will be enough remaining fields of the message for an effective overwrite operation. For instance, message neutralizer 142 may overwrite one or more bits in the data field, one or more bits in the CRC field, etc. Message neutralizer 142 will cause a different type of error, depending on the field overwritten. For instance, message neutralizer 142 may cause a bit stuffing error, a bit monitoring error, a frame check error, an ACK error, and/or a CRC error. For instance, overwriting one or more bits of the data field will cause a CRC mismatch at the receiving ECUs. Consequently, the receiving ECUs will not acknowledge the attacker's message as a valid message and therefore will not consume that message.

As shown in FIG. 5, once the message has been neutralized, the state of AAPM 22 may switch from Message Neutralization 140 to New Message Detection 110. Similarly, as shown in FIG. 8, the process may pass from block 432 to block 404, and AAPM 22 may then process subsequent messages as indicated above.

According to the CAN bus protocol, whenever a node transmits a message, the transmitting node puts a recessive (1) in the ACK slot. And whenever a node receives a valid message, the receiving node overwrites the recessive (1) in the ACK slot with a dominant (0). Consequently, if the transmitting node sees a dominant (0) in the ACK slot, the transmitting node may safely conclude that at least one node successful received the message. However, if the message has been neutralized, no nodes will write a dominant (0) to the ACK slot. Accordingly, once a node has finished receiving the ACK bit, if the ACK bit is recessive, the recessive ACK bit may be considered an error flag. Similarly, if a receiving node allows a recessive ACK bit to remain, the receiving node may be considered to have raised an error.

Accordingly, in one scenario, VCM 20 may neutralize a malicious message, as indicated above. Then, one or more other nodes (e.g., SCM 30 and HCM 40) may determine that the neutralized message is invalid. Accordingly, those nodes will raise an error for that message, by leaving the ACK bit recessive.

In addition to actively neutralizing masquerading messages, AAPM 22 may cause the node or nodes that are generating masquerading messages to disengage from CAN bus 12. In particular, each node on CAN bus 12 includes a transmit error counter (TEC) in its MCU, and in order to achieve fault containment, that TEC automatically disconnects the node after the node has experienced a predetermined number of transmit or receive errors. For instance, the TEC in a node automatically increments an error metric for that node by 8 every time a transmission error occurs (e.g., when a message that was generated by that node is not acknowledged by any of the other nodes in the bus). The TEC also decrements the error metric by 1 every time the node makes a successful transmission. Moreover, if the error metric reaches a predetermined error threshold (such as 256), the node will automatically pull itself from the bus and enter the so-called "bus-off state." Subsequently, the node will exit bus-off state whenever the bus is idle for 128 sequences of 11 recessive signals.

Accordingly, as shown in FIGS. 3 and 4, MCU 26 includes a TEC 27, and MCU 56 includes a TEC 57. Referring also to FIG. 6, once message neutralizer 142 in AAPM 22 overwrites the message in the bus, if the message came from attack node 50, TEC 57 in attack node 50 will start to accumulate transmit errors. After a number of masquerading attempts, the error metric will meet or exceed the error threshold (e.g., 256), and TEC 57 will therefore cause attack node 50 to enter the bus-off state. In at least one embodiment, TEC 57 cannot be disabled or altered by malware 58.

In addition, VCS 10 may provide for a mode of operation that protects the vehicle in case of faulty ECUs. That mode of operation may be referred to as limp mode. In limp mode, the vehicle may behave differently, but within safe bounds. For instance, if attack node 50 has been disabled by TEC 57, the limp mode may cause VCS 10 to shift one or more other ECUs (e.g., ECUs responsible for acceleration and braking) into a state of reduced functionality, for instance to enable the vehicle to travel at a reduced speed, rather than simply being unable to travel at all.

Thus, the present disclosure describes systems and methods for neutralizing masquerading attacks in vehicle control systems. For purposes of illustration, the disclosure above focuses primarily on a VCS with a LAN that is implemented using a CAN bus. However, the present teachings may also be used to advantage in other types of systems and with other types of LANs. For instance, an alternative embodiment may use the present teachings to combat masquerading messages on an Ethernet LAN. In such an embodiment, each node on the LAN may have an assigned media access control (MAC) address, the messages may be formatted as Ethernet packages, and each node may include an AAPM that examines the source MAC address field of each packet to determine whether that node has been spoofed (i.e., has been falsely identified as the message source). And in response to detecting that it has been spoofed, the node may neutralize the message by overwriting one or more bits in the payload of the message, or by otherwise altering the message to prevent other nodes from accepting the message as valid.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

As described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

What is claimed is:

1. A vehicle with a vehicle control system with active attack neutralization, the vehicle comprising:
   a vehicle control system (VCS) comprising a controller area network (CAN) bus and multiple electronic control units (ECUs) in communication with the CAN bus; and
   a transceiver in each of the multiple ECUs, the transceiver to enable communication with the CAN bus; and
   wherein at least one of the ECUs comprises an active attack prevention module (AAPM) in communication with the transceiver in said ECU, wherein the AAPM enables said ECU to:
   monitor the LAN for messages;
   in response to detecting a message on the LAN, automatically determine whether the message falsely identifies said ECU as a source, based on a value in an identifier field in the message; and
   in response to determining that the message falsely identifies said ECU as the source, automatically take at least one remedial action to neutralize the message before all of the message has been received on the LAN.

2. A vehicle according to claim 1, wherein:
   the identifier field comprises a message identifier (ID) field; and
   the operation of automatically taking at least one remedial action to neutralize the message before all of the message has been received on the LAN comprises overwriting at least one recessive bit with at least one dominant bit in at least one field of the message following the message ID field.

3. A data processing system that provides for active prevention of masquerading attacks, the data processing system comprising:
   a microcontroller to enable the data processing system to operate as a node in a vehicle control system (VCS);
   a transceiver to enable the node to communicate with a local area network (LAN) of the VCS; and
   an active attack prevention module (AAPM) in communication with the microcontroller and in communication with the transceiver, wherein the AAPM enables the node to:
   monitor the LAN for messages;
   in response to detecting a message on the LAN, automatically determine whether the message falsely identifies the node as a source, based on a value in an identifier field in the message; and
   in response to determining that the message falsely identifies the node as the source, automatically take at least one remedial action to neutralize the message before all of the message has been received on the LAN.

4. A data processing system according to claim 3, wherein:
the transceiver enables the node to communicate with a controller area network (CAN) bus;
the identifier field comprises a message identifier (ID) field; and
the operation of automatically taking at least one remedial action to neutralize the message before all of the message has been received on the LAN comprises overwriting at least one recessive bit with at least one dominant bit in at least one field of the message following the message ID field.

5. A data processing system according to claim 4, wherein the operation of overwriting at least one recessive bit with at least one dominant bit in at least one field of the message following the message ID field comprises:
overwriting at least one recessive bit with at least one dominant bit in at least one field of the message from the group consisting of a data field and a cyclic redundancy check (CRC) field.

6. A data processing system according to claim 3, wherein the AAPM is configured to automatically determine whether the message falsely identifies the node as the source by:
automatically determining whether the value in the identifier field in the message matches an identifier for the node; and
automatically determining whether the node is transmitting the message.

7. A data processing system according to claim 3, wherein the AAPM comprises:
a message identifier (ID) verifier that enables the node to automatically determine whether the value in the identifier field in the message incorrectly identifies the node as the source of the message.

8. A data processing system according to claim 7, wherein the message ID verifier comprises:
a hardware comparator that enables the message ID verifier to simultaneously compare the value from the identifier field in the message with two or more identifiers for the node.

9. A data processing system according to claim 7, wherein the message ID verifier enables the node to:
determine whether the node is currently transmitting the message with the value in the identifier field correctly identifying the node as the source of the message; and
determine that the message does not falsely identify the node as the source, in response to determining that the node is currently transmitting the message with the value in the identifier field correctly identifying the node as the source of the message.

10. A data processing system according to claim 3, wherein the AAPM comprises:
a message neutralizer that enables the node to neutralize the message by changing at least one bit in at least one field the message before all of the message has been received on the LAN.

11. A data processing system according to claim 10, wherein:
the identifier field comprises a message identifier (ID) field; and
the message neutralizer is configured to neutralize the message by changing at least one bit in at least one field of the message following the message ID field.

12. A data processing system according to claim 11, wherein the message neutralizer is configured to neutralize the message by changing at least one bit in at least one field from the group consisting of a data field and a cyclic redundancy check (CRC) field.

13. A method for actively preventing masquerading attacks in a local area network, the method comprising:
at a node on a local area network (LAN) for a vehicle control system (VCS), monitoring the LAN for messages;
in response to detecting a message on the LAN, automatically determining, at the node, whether the message falsely identifies the node as a source, based on a value in an identifier field in the message; and
in response to determining that the message falsely identifies the node as the source, automatically taking at least one remedial action to neutralize the message before all of the message has been received on the LAN.

14. A method according to claim 13, wherein:
the LAN comprises a controller area network (CAN) bus;
the identifier field comprises a message identifier (ID) field; and
the operation of automatically taking at least one remedial action to neutralize the message before all of the message has been received on the LAN comprises overwriting at least one recessive bit with at least one dominant bit in at least one field of the message following the message ID field.

15. A method according to claim 14, wherein the operation of overwriting at least one recessive bit with at least one dominant bit in at least one field of the message following a message ID field comprises:
overwriting at least one recessive bit with at least one dominant bit in at least one field of the message from the group consisting of a data field and a cyclic redundancy check (CRC) field.

16. A method according to claim 13, wherein the operation of automatically determining whether the message falsely identifies the node as the source comprises:
automatically determining whether the value in the identifier field in the message matches an identifier for the node; and
automatically determining whether the node is transmitting the message.

17. A method according to claim 13, wherein the operation of automatically determining whether the message falsely identifies the node as the source comprises:
automatically determining whether the value in the identifier field in the message incorrectly identifies the node as the source of the message.

18. A method according to claim 17, wherein the operation of automatically determining whether the value in the identifier field in the message incorrectly identifies the node as the source of the message comprises:
using a hardware comparator in the node to simultaneously compare the value from the identifier field in the message with two or more identifiers for the node.

19. A method according to claim 17, wherein the operation of automatically determining whether the value in the identifier field in the message incorrectly identifies the node as the source of the message comprises:
determining whether the node is currently transmitting the message with the value in the identifier field correctly identifying the node as the source of the message; and
determining that the message does not falsely identify the node as the source, in response to determining that the node is currently transmitting the message with the value in the identifier field correctly identifying the node as the source of the message.

20. A method according to claim 13, wherein the operation of automatically taking at least one remedial action to neutralize the message before all of the message has been received on the LAN comprises:
    using a transceiver of the node to change at least one bit in at least one field of the message before all of the message has been received on the LAN.

* * * * *